US008116371B2

(12) United States Patent
Shima

(10) Patent No.: US 8,116,371 B2
(45) Date of Patent: Feb. 14, 2012

(54) VLC TECHNIQUE FOR LAYERED VIDEO CODING USING DISTINCT ELEMENT GROUPING

(75) Inventor: Masato Shima, Ibaraki (JP)

(73) Assignee: Texas Instruments Incorporated, Dallas, TX (US)

( * ) Notice: Subject to any disclaimer, the term of this patent is extended or adjusted under 35 U.S.C. 154(b) by 1353 days.

(21) Appl. No.: 11/682,356

(22) Filed: Mar. 6, 2007

(65) Prior Publication Data

US 2007/0211950 A1    Sep. 13, 2007

Related U.S. Application Data

(60) Provisional application No. 60/780,192, filed on Mar. 8, 2006.

(51) Int. Cl.
*H04N 7/12* (2006.01)
(52) U.S. Cl. ............................. 375/240.01; 375/240.23
(58) Field of Classification Search .................. 382/246; 375/240.01, 240.02, 240.03, 240.12, 240.23
See application file for complete search history.

(56) References Cited

U.S. PATENT DOCUMENTS

| | | | | |
|---|---|---|---|---|
| 5,321,776 A * | 6/1994 | Shapiro | ................. | 382/240 |
| 5,526,054 A * | 6/1996 | Greenfield et al. | ........... | 348/467 |
| 5,737,020 A * | 4/1998 | Hall et al. | ................. | 375/240.2 |
| 6,160,846 A * | 12/2000 | Chiang et al. | ............. | 375/240.05 |
| 6,198,767 B1 * | 3/2001 | Greenfield et al. | ....... | 375/240.01 |
| 6,549,575 B1 * | 4/2003 | Butter et al. | ............. | 375/240.16 |
| 6,961,383 B1 * | 11/2005 | Reibman et al. | ......... | 375/240.25 |
| 7,460,506 B2 * | 12/2008 | Ro et al. | ........................ | 370/335 |
| 7,864,663 B2 * | 1/2011 | Dent | ............................. | 370/210 |
| 2003/0056371 A1 * | 3/2003 | Honda | ............................ | 29/893 |
| 2003/0138157 A1 * | 7/2003 | Schwartz | ...................... | 382/240 |
| 2005/0015249 A1 * | 1/2005 | Mehrotra et al. | ............. | 704/230 |
| 2005/0052294 A1 * | 3/2005 | Liang et al. | ..................... | 341/63 |
| 2005/0249289 A1 * | 11/2005 | Yagasaki et al. | ......... | 375/240.18 |
| 2006/0158355 A1 * | 7/2006 | Jeon et al. | ....................... | 341/50 |
| 2007/0046504 A1 * | 3/2007 | Ridge et al. | ..................... | 341/50 |
| 2007/0211950 A1 * | 9/2007 | Shima | .......................... | 382/246 |

OTHER PUBLICATIONS

Gary et all, Rate distorion optimization for video compression, 1998, IEEE singal processing magaine, p. 1-90.*
Shima, Masato; *Modified VLC for Refinement Pass*, Joint Video Team (JVT) of ISO/IEC MPEG & ITU-T VCEG (ISO/IEC JTC1/SC29/WG11 and ITU-T SG16 Q.6) 19th Mtg.: Geneva, CH, Mar. 31-Apr. 7, 2006.

* cited by examiner

*Primary Examiner* — Eleni Shiferaw
*Assistant Examiner* — Abu Sholeman
(74) *Attorney, Agent, or Firm* — Robert D. Marshall, Jr.; W. James Brady; Frederick J. Telecky, Jr.

(57) ABSTRACT

The layered coding technique is employed to achieve the image quality scalability for video coding standards. The desired image quality scalability can be achieved by refining the image coefficients in subsequent enhancement layers. In most cases, the refinement coefficient consists of some binary information such as whether this coefficient is refined in this coding pass, whether this coefficient is positively or negatively refined, etc. Because it is generally difficult to code binary information efficiently with VLC (Variable Length Coding) technology, this disclosure introduces a method to code refinement symbol more efficiently with VLC by grouping the symbols of distinct binary elements.

6 Claims, 3 Drawing Sheets

FIG. 2
*(PRIOR ART)*

| COEFFICIENT INDEX | COEFFICIENTS CODED IN PRECEDING LAYERS | REFINEMENT COEFFICIENTS TO BE CODED IN THIS LAYER | CODED ELEMENTS | | |
|---|---|---|---|---|---|
| | | | REFINEMENT FLAG | REFINEMENT SIGN | REFINEMENT MAGNITUDE |
| 0 | 32 | 0 | 0 (NO REFINEMENT) | -- | -- |
| 1 | -8 | 2 | 1 (REFINEMENT) | 0 (POSITIVE) | 2 |
| 2 | 16 | 1 | 1 (REFINEMENT) | 0 (POSITIVE) | 1 |
| 3 | 24 | 1 | 1 (REFINEMENT) | 0 (POSITIVE) | 1 |
| 4 | -40 | -4 | 1 (REFINEMENT) | 1 (NEGATIVE) | 4 |
| 5 | 8 | 0 | 0 (NO REFINEMENT) | -- | -- |
| 6 | -16 | 1 | 1 (REFINEMENT) | 0 (POSITIVE) | 1 |

FIG. 3
*(PRIOR ART)*

| GROUPED SYMBOL | CODEWORD |
|---|---|
| 00 | 0 |
| 01 | 10 |
| 10 | 110 |
| 11 | 111 |

00|10|00|00|00|01  (12 BINARY SYMBOLS)
→ 0  10
→ 0  0
→ 0  0
→ 0  0
→ 110
→ 0
0 110 0 0 0 10  (9 BITS CODE)

FIG. 4
*(PRIOR ART)*

| CODED ELEMENTS | | |
|---|---|---|
| REFINEMENT FLAG | REFINEMENT SIGN | REFINEMENT MAGNITUDE |
| 0111101 | 00010 | 21141 |

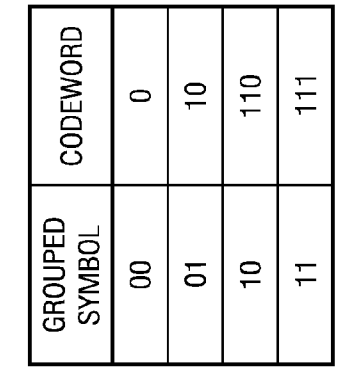

01 | 11 | 10 | 1 | 00 | 01 | 0 | 21141
FRACTIONAL  GROUPING  FRACTIONAL and a longer code to less frequent symbols. Thus a 1 bit codeword will be assigned to a symbol even if that symbol appears with extremely high probability (e.g. nearly 100%). Therefore, it is believed variable length coding of binary symbols is inefficient. The JPEG 2000 standard employs arithmetic coding technology to address this problem. The JPEG 2000 standard is a known as still image coding standard with quality and other various scalability features. However, it is known that arithmetic coding technology is much more complex computationally than VLC technology. Therefore, some VLC based technique that would efficiently code the refinement symbols is desired.

VLC TECHNIQUE FOR LAYERED VIDEO CODING USING DISTINCT ELEMENT GROUPING

CLAIM OF PRIORITY

This application claims priority under 35 U.S.C. 119(e)(1) to U.S. Provisional Application No. 60/780,192 filed Mar. 8, 2006.

TECHNICAL FIELD OF THE INVENTION

The technical field of this invention is improving the compression efficiency with a quality scalability feature, which is applicable to video coding and other coding technologies such as imaging, audio, etc.

BACKGROUND OF THE INVENTION

Imaging and video coding standards (such as JPEG, MPEG, and H.26x) have evolved greatly in the past decade. In the early stages, the main requirements and objective for such video coding standards were compression efficiency. With the expansion of markets, video coding standards began to require other attractive features in addition to high compression efficiency. One of the most desired features is image quality scalability. In most cases, image quality scalability is achieved by a layered video coding technique. This includes a base layer and subsequent separate enhancement layers. The base layer is the minimum of coded data sufficient to generate a visible video sequence. An existing video coding standard can be the base layer. Each enhancement layer contains data to improve the quality of the decoded image over the base layer and preceding enhancement layers. In general, these enhancement layers refine the values of transformed coefficients. For example, suppose the desired transformed coefficient to be coded is 25. A scalable formation of 25 can be achieved by coding 16 in the base layer, 8 in the first enhancement layer and 1 in the second enhancement layer.

There are two main objectives in processing an enhancement layer: propagation of significance; and refinement of magnitude. In propagation of significance, the enhancement layer coder seeks a non-significant coefficient. Such a non-significant coefficient is not yet coded in preceding layers. The coder codes the location of the coefficient and its magnitude if necessary. Because the significance of the coefficient will greatly depend on the neighboring coefficients and the location of the coefficient can be encoded in various ways, it is relatively easy to efficiently code the propagation of significance in variable length coding (VLC).

In the refinement of magnitude, the enhancement layer coder seeks a significant coefficient which is already coded in preceding layers. Unlike the propagation of significance, the refinement of magnitude is almost independent of the status of neighboring coefficients or the coefficient itself. In most cases, the coder will generate a binary flag indicating whether this coefficient will be refined or not. This is called a refinement flag. Depending on the method of refinement, the sign of refinement (called refinement sign) and the magnitude of refinement (called refinement magnitude especially if greater than 1) are also coded. Many binary symbols need to be coded in this refinement of magnitude process. Efficient coding of such binary symbols is important to the quality scalability with a desired compression efficiency.

A VLC technique is generally employed to improve the coding efficiency. A shorter code is assigned to more frequent symbols, and a longer code to less frequent symbols. Thus a FIG. 1 illustrates flowchart of a typical refinement symbol coding technique 100 using VLC. Technique 100 begins with start block 101. Block 102 scans the coefficients and identifies those to be coded using this process. Block 103 divides each refinement coefficient into several informational elements. As noted above these informational elements typically include refinement flag, refinement sign and refinement magnitude. Block 104 groups the current binary informational element symbols. For the first iteration, the current binary informational element symbols is the first binary informational element symbols. Block 105 codes the grouped symbols using a known VLC technique. Block 106 codes any remaining fractional symbols. Test block 107 determines if there are remaining binary informational symbols. If there are remaining binary informational symbols (Yes at test block 107), then block 108 starts the next binary informational symbols. Technique 100 returns to block 104 to start coding this next binary informational symbol. If there are no remaining binary informational symbols (No at test block 107), then block 109 uses a VLC technique to code any remaining non-binary elements. Technique 100 ends at end block 110.

FIG. 2 illustrates an example of the conventional VLC method to code refinement symbols. This example assumes that a refinement flag, a refinement sign and a refinement magnitude are to be coded. The first column of the first half is a coefficient index from 0 to 6. The second column of the first half is the coefficient data already coded in preceding layers. The third column of the first half is the refinement coefficients to be coded in the current layer. After coding the current layer, the refined coefficients data will be the summation of the second column and the third column. The second half shows the coding of these refinement coefficients. The refinement coefficients are divided into the following three elements: refinement flag (fourth column, binary), refinement sign (fifth column, binary), and refinement magnitude (sixth column, multinary).

For coefficient index 0 the refinement coefficient of the current layer is 0. This is coded using a 0 refinement flag. No refinement sign or refinement magnitude are coded in this case.

For coefficient index 1 the refinement coefficient of the current layer is 2. This is coded using a 1 refinement flag, a 0 refinement sign indicating a positive sign and a refinement magnitude of 2.

For coefficient index 2 the refinement coefficient of the current layer is 1. This is coded using a 1 refinement flag, a 0 refinement sign indicating a positive sign and a refinement magnitude of 1.

For coefficient index 3 the refinement coefficient of the current layer is also 1. This is coded using a 1 refinement flag, a 0 refinement sign indicating a positive sign and a refinement magnitude of 1.

For coefficient index 4 the refinement coefficient of the current layer is −4. This is coded using a 1 refinement flag, a 1 refinement sign indicating a negative sign and a refinement magnitude of 4.

For coefficient index 5 the refinement coefficient of the current layer is 0. This is coded using a 0 refinement flag. No refinement sign or refinement magnitude is coded.

For coefficient index 6 the refinement coefficient of the current layer is 1. This is coded using a 1 refinement flag, a 0 refinement sign indicating positive sign and a refinement magnitude of 1.

Depending on the implementation of this refinement symbol coding, the refinement magnitude may be omitted by restricting the magnitude to 1. The refinement sign may be omitted by allowing only positive refinement coefficients. Those up to these three elements are coded in this VLC technique.

As previously noted, VLC coding of binary symbols tends to be inefficient. Each symbol requires one bit regardless of the probability of the coded symbols. A grouping approach may be employed in some implementations to improve compression efficiency. The grouping approach bundles several binary symbols of the same element into one new symbol. Symbols of the same element are expected to have almost equivalent probability of 0 or 1. A codeword is assigned to each possible bundled new symbol.

FIG. 3 illustrates an example of such a grouping of length 2. Grouped symbols 00 are coded as 0. Grouped symbols 01 are coded as 10. Grouped symbols 10 are coded as 110. Grouped symbols 11 are coded as 111. In the example of FIG. 3 0 is the most probable symbol. FIG. 3 illustrates an example 12 bit symbol set that can be coded using only 9 bits due to the grouping. Larger grouping lengths (such as 3, 4 or more) may be used to further improve the compression efficiency if the probability of the binary symbols is more biased.

FIG. 4 illustrates an example grouping with length 2 for refinement elements using the same example as illustrated in FIG. 2. FIG. 4 illustrates that symbols of the same element type are grouped and coded according to the grouping length. Any remaining ungrouped symbols of that element type are treated as fractional symbols. Such fractional symbols are coded individually. Thus FIG. 4 illustrates grouping the refinement flags into groups 10, 11 and 10 with a fractional symbol 1. FIG. 4 also illustrates grouping the refinement signs into groups 00 and 01 with a fractional symbol 0. Note the arithmetic data of the refinement magnitude is not grouped.

Fractional symbols worsen the compression efficiency because those symbols are not coded by more efficient VLC tables. In an ideal case, the symbols of one element type in the whole layer are coded at once to achieve the maximum compression efficiency because it minimizes the number of non-grouped fractional symbols. However, due to the demand for fine-grained scalability, the coefficients in one layer tend to be divided into smaller pieces depending on their frequency band. The lower frequency band has higher priority. Due to memory bandwidth restrictions each piece is further divided into smaller coding units based on their spatial location by smaller rectangular region called codeblock or macroblock. Therefore, there will be many coding units within one layer and each coding unit will contain few coefficients in actual implementation of quality scalable video coding technology. In these cases, there will be many fractional symbols causing compression inefficiency.

When fine-grained scalability is required, a refinement magnitude of only 0 or 1 should be allowed and the number of non-zero refinement coefficients should decrease. In this case, many coding units contain few symbols (i.e. 0 or 1) for the refinement sign. This creates many fractional symbols, which reduces compression efficiency.

Therefore, VLC based technique that codes the elements required for refinement of magnitude more efficiently without losing the functionality of image quality scalability would be desirable.

SUMMARY OF THE INVENTION

The present invention is an improved compression efficiency method of video coding with quality scalability. This method extends the informational elements coded by a VLC technique. This invention includes of the following steps:

Group the first binary element of magnitude refinement process. This is the refinement flag in the example of FIGS. 2 and 4. This grouping depends on the probability balance of 0 and 1. Then code the grouped symbols using the VLC table prepared depending on the probability balance of 0 and 1. Note this step is optional.

Compare the probability balance of the current binary element and that of the next binary element.

If the probability balance of the current binary element and that of next binary element is completely different, then code the fractional symbol of the current binary element and the next binary element independently. The next binary element is the refinement sign in the example of FIGS. 2 and 4. An example of a completely different probability balance is change from a 0:1 balance of 90%:10% to a 0:1 balance of 50%:50%.

If the probability balance of the current binary element and that of next binary element is similar but of opposite polarity, then every binary symbol of the next binary element will be bit-reversed and bundled with the fractional binary symbol of the current element. An example of a similar balance of the opposite polarity is a change from a 0:1 balance of 90%:10% to a 0:1 balance of 10%:90%. Then the bundled bit symbols are grouped and coded according to the grouping length and VLC table used for the current layer.

Otherwise if the probability balance of the current binary element and that of next binary element is similar and its polarity is the same, then the binary symbols of the next binary element will be bundled with the fractional binary symbol of the current element. An example is change from a 0:1 balance of 90%:10% to a 0:1 balance of 88%:12%. Then the bundled bit symbols are grouped and coded according to the grouping length and VLC table used for the current layer.

These steps repeat for each subsequent binary element to be coded in the magnitude refinement process.

Any remaining ungrouped binary symbols are then coded.

Any remaining non-binary elements of this magnitude refinement process are coded using some VLC technology.

This invention decreases the number of fractional binary symbols to be coded. This is advantageous because these fractional binary symbols would worsen the compression efficiency. This invention is applicable alone or in combination with other schemes for improving video coding efficiency.

BRIEF DESCRIPTION OF THE DRAWINGS

These and other aspects of this invention are illustrated in the drawings, in which:

FIG. 2 is an example of the conventional VLC refinement signal coding (prior art);

FIG. 3 illustrates the grouping of symbols according to the prior art;

FIG. 4 illustrates an example of grouping of symbols for refinement elements according to the prior art.

DETAILED DESCRIPTION OF PREFERRED EMBODIMENTS

Figure 5:
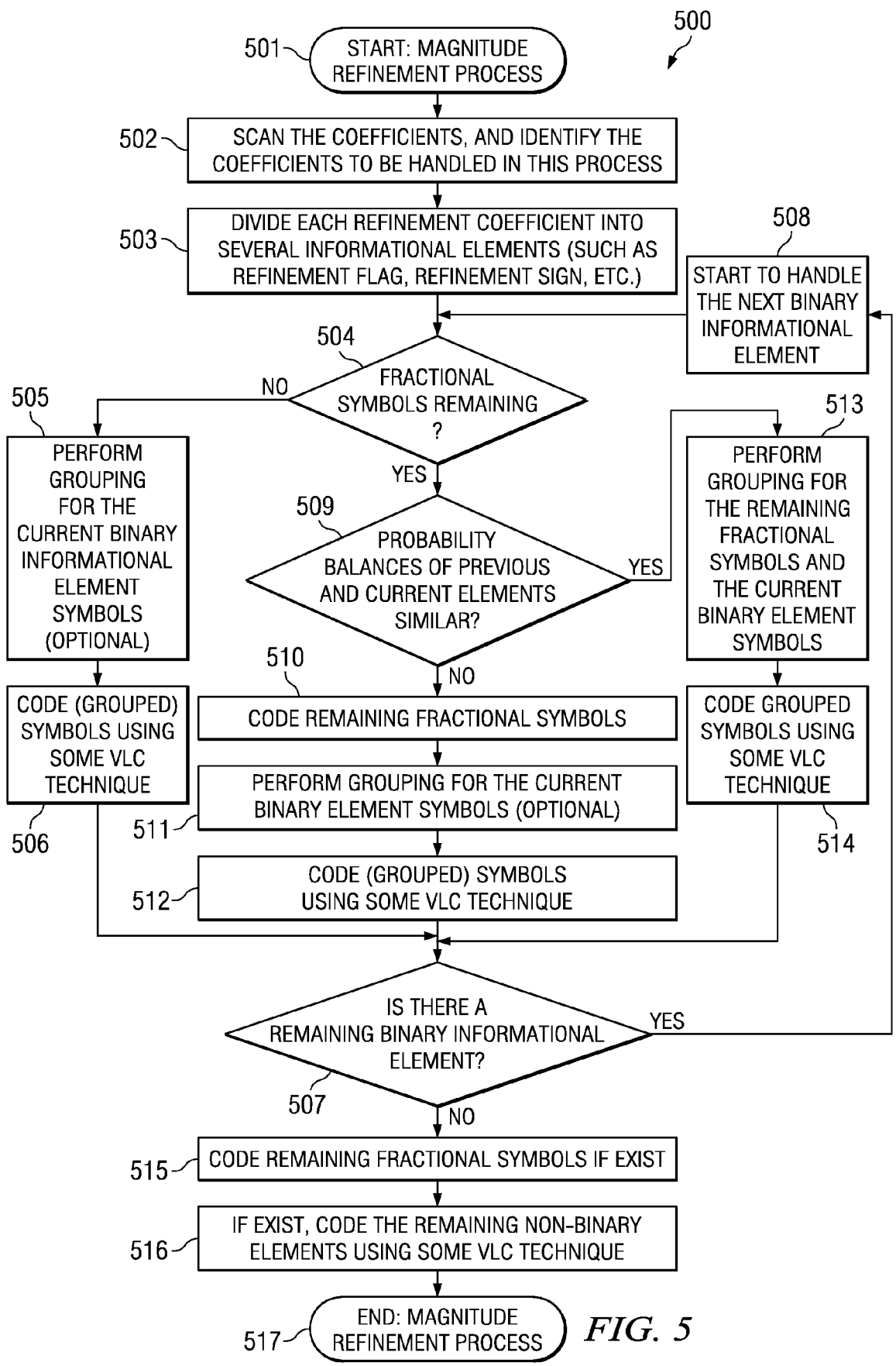
FIG. 5 is a flowchart illustrating refinement symbol coding of this invention.

FIG. 5 is a flowchart illustrating method 500 of this invention. The method of this invention is based on the two ideas. First, the probability balance of a binary informational element tends to be biased especially for the enhancement layers closer to the base layers. Thus, it is expected that each binary element tends to have the similar probability balance and grouping distinct element symbols should be less problematic. Second, grouping distinct element symbols should reduce the number of fractional binary symbols that make VLC coding inefficient. Accordingly, this invention improves compression efficiency by employing smart grouping of distinct element symbols.

Figure 1:
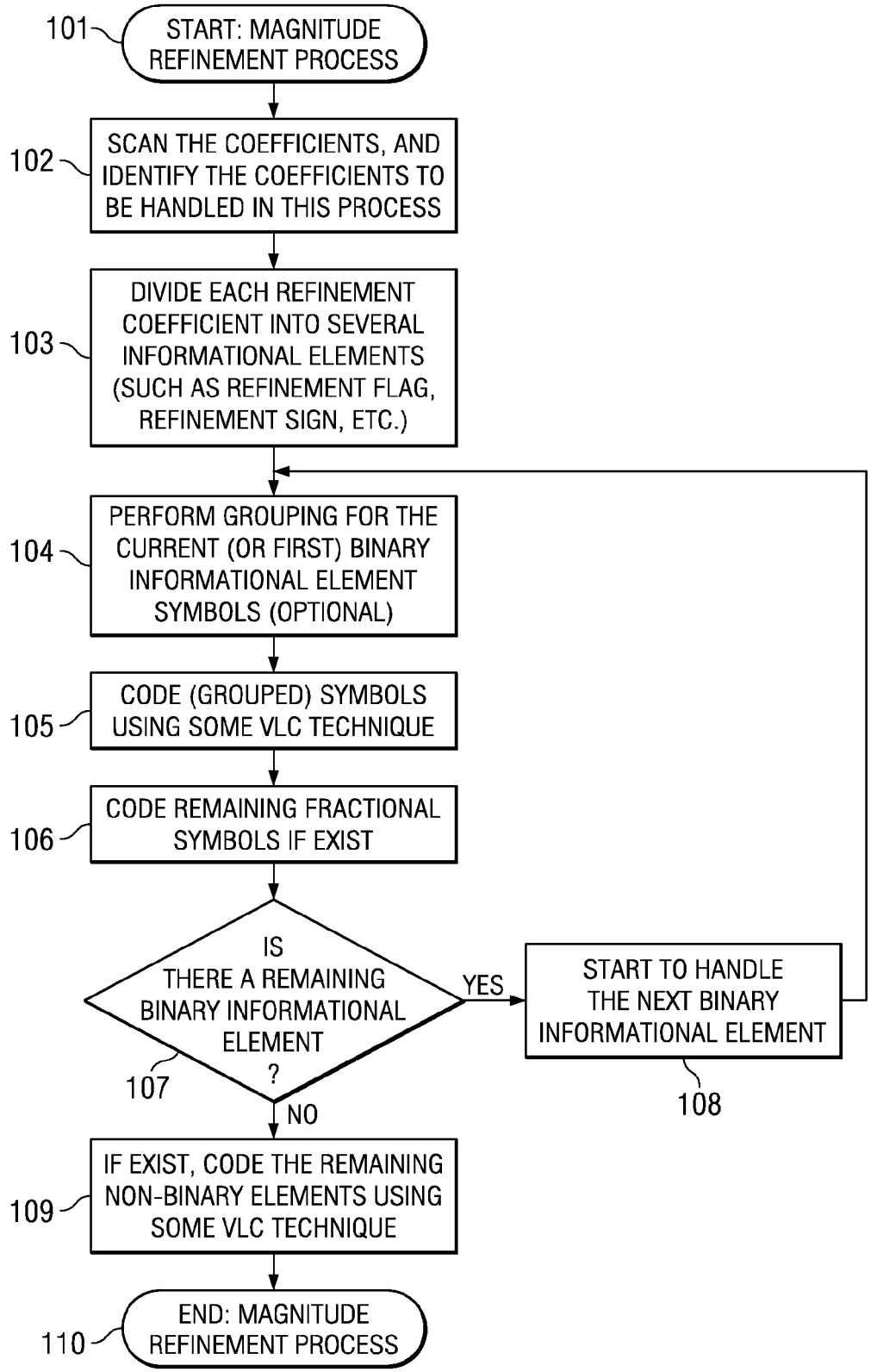
FIG. 1 is a flowchart illustrating the conventional VLC refinement signal coding (prior art)

Technique 500 begins with start block 501. Block 502 scans the coefficients and identifies those to be coded using this process. Block 503 divides each refinement coefficient into several informational elements. These blocks are the as respective blocks 102 and 103 of the prior art technique illustrated in FIG. 1. Test block 504 determines if there are any remaining fractional symbols. If there are no remaining fractional symbols (No in test block 504), then block 505 groups the current binary informational element symbols. Block 506 codes the grouped symbols using a known VLC technique. These are similar to the prior art of respective blocks 104 and 105 illustrated in FIG. 1. Test block 507 determines if there are remaining binary informational symbols. If there are remaining binary informational symbols (Yes at test block 507), then block 508 starts the next binary informational symbols. Technique 500 returns to block 504 to start coding this next binary informational symbol. These processes are the same as respective blocks 107 and 108 illustrated in FIG. 1.

If there were fractional symbols remaining (Yes at test block 504), then test block 509 determines whether the probability balance for the previous and current elements are similar. If this probability balance was not similar (No at test block 509), then block 510 codes these remaining fractional symbols. In this case no advantage can be achieved by coding these fractional symbols with the following grouped symbols. Thus they are independently coded. Optional block 511 groups the current binary element symbol elements. Block 512 codes these grouped symbols using a VLC technique. Test block 507 determines if there are remaining binary informational symbols. If there are remaining binary informational symbols (Yes at test block 507), then block 508 starts the next binary informational symbols.

If this probability balance was similar (Yes at test block 509), then block 513 groups these remaining fractional symbols with the current binary symbol elements. In this case, it is expected that grouping symbol elements across the previous and current binary element symbols would be advantageous. If the probability balances are similar but of opposite polarity, it is expected that the compression efficiency can be maximized by matching the more probable symbol of current element with that of previous element. In this case block 513 bit reverses the current binary element symbols. Block 513 then groups the symbols of the current element with the fractional symbols of previous element. Block 514 codes these grouped symbols using a VLC technique. If there are remaining binary informational symbols (Yes at test block 507), then block 508 starts the next binary informational symbols.

If there are no remaining binary informational symbols (No at test block 507), then block 515 codes any remaining fractional symbols. Block 516 codes any remaining non-binary elements using a VLC technique. Technique 500 ends at end block 517.

Statistical evidence for the effectiveness of the invented method is described in Tables 1, 2 and 3. Table 1 shows the conventional VLC table for 3 bit binary symbols.

TABLE 1

| Grouped Symbols | Codeword |
|---|---|
| 000 | 0 |
| 001 | 010 |
| 010 | 011 |
| 011 | 11100 |
| 100 | 110 |
| 101 | 11101 |
| 110 | 11110 |
| 111 | 11111 |

Coding with this VLC table will achieve higher compression efficiency than direct binary flag coding if the probability of 0 is greater than $2/3$. Table 2 shows the joint probability of both refinement flag and refinement sign having symbol 0 with the probability greater than $2/3$ using the SVC (Scalable Video Coding) video coding standard standardized as an amendment to the H.264/MPEG-4 AVC standard for various images.

TABLE 2

| Sequence | Joint probability of "probability of 0" > $2/3$ | Joint probability of "probability of MPS" > $2/3$ |
|---|---|---|
| BusQCIF | 0.729 | 0.733 |
| FootballQCIF | 0.714 | 0.723 |
| ForemanQCIF | 0.696 | 0.765 |
| MobileQCIF | 0.674 | 0.786 |
| CityQCIF | 0.701 | 0.735 |
| CrewQCIF | 0.581 | 0.738 |
| HarbourQCIF | 0.804 | 0.809 |
| SoccerQCIF | 0.741 | 0.764 |
| BusCIF | 0.811 | 0.811 |
| FootballCIF | 0.680 | 0.689 |
| ForemanCIF | 0.663 | 0.721 |
| MobileCIF | 0.690 | 0.759 |
| CityCIF | 0.767 | 0.791 |
| CrewCIF | 0.657 | 0.784 |
| HarbourCIF | 0.736 | 0.740 |
| SoccerCIF | 0.787 | 0.804 |
| City4CIF | 0.760 | 0.765 |
| Crew4CIF | 0.615 | 0.756 |
| Harbour4CIF | 0.706 | 0.754 |
| Soccer4CIF | 0.784 | 0.789 |
| Average | 0.715 | 0.761 |
| Minimum | 0.581 | 0.689 |
| Maximum | 0.811 | 0.811 |

The probabilities of 0 for the refinement flag and the refinement sign were measured for each enhancement layer of each coded picture. The probability over all the enhancement layers that both refinement flag and refinement sign had probability of 0 or a probability of the more probable symbol (MPS) greater than $2/3$ was measured. As shown in Table 2, an average of more than 70% of enhancement layers are expected to improve in compression efficiency employing this invention bundling the binary symbols of distinct elements. Upon introduction of the bit reversing technique, an average of more than 75% of enhancement layers benefit in compression efficiency.

Table 3 shows the results of using this invention. This invention results in improvement of compression efficiency. Table 3 shows the number of coded bits needed to represent refinement symbols with and without the invention using the one of the official test conditions of the SVC standard.

TABLE 3

| SNR Scalability Test Condition | Coded Bits for Refinement Symbols | | Bit Reduction (%) |
|---|---|---|---|
| | Prior Art | Invention | |
| BusQCIF | 543,672 | 538,409 | −0.97% |
| FootballQCIF | 1,934,486 | 1,922,671 | −0.61% |
| ForemanQCIF | 547,711 | 846,054 | −0.30% |
| MobileQCIF | 874,995 | 865,834 | −1.05% |
| CityQCIF | 674,255 | 669,438 | −0.71% |
| CrewQCIF | 1,186,048 | 1,182,662 | −0.29% |
| HarbourQCIF | 1,401,894 | 1,382,728 | −1.37% |
| SoccerQCIF | 1,011,857 | 1,005,117 | −0.67% |
| BusCIF | 2,019,615 | 2,002,910 | −0.83% |
| FootballCIF | 7,190,479 | 7,169,359 | −0.29% |
| ForemanCIF | 1,959,847 | 1,953,504 | −0.32% |
| MobileCIF | 3,409,871 | 1,953,504 | −1.34% |
| CityCIF | 2,532,930 | 2,513,988 | −0.75% |
| CrewCIF | 4,730,987 | 4,743,358 | 0.26% |
| HarbourCIF | 6,019,396 | 5,938,032 | −1.35% |
| SoccerCIF | 4,207,685 | 4,181,351 | −0.63% |
| City4CIF | 19,752,531 | 19,538,184 | −1.09% |
| Crew4CIF | 22,027,283 | 22,124,102 | 0.44% |
| Harbour4CIF | 27,226,782 | 27,087,042 | −0.51% |
| Soccer4CIF | 18,728,169 | 18,688,922 | −0.21% |
| | | Average | −0.63% |

Table 3 shows the invention does not always result in bit-reduction as in the CrewCIF and Crew4CIF sequences. However, the bit-reduction occurs in most sequences. Also, the overall bit-reduction is estimated as 0.63% on average.

There are minor concerns on increasing complexity and worsening error resilience. However, the increase in complexity increase of the invention is negligible because the scanning process to detect the coefficients to be refined is much more complex. The invention will not be processed over the existing boundaries of spatial location and frequency band. The error resilience should not be an issue because subsequent binary symbols are dependent on the preceding binary symbols. Thus the negative effects of this invention are negligible.

This invention results in reduction of the amount of coded bits for refinement symbols by 0.65% on average in one of the official test condition of video coding standardization activities. The negative effects of the invention are negligible.

What is claimed is:

1. A method of transforming a video into a coded compressed video with improved compression efficiency and quality scalability including coding refinement symbols video with quality scalability that contains the binary informational elements, comprising the steps of:

classifying refinement coefficients into at least one binary element symbol and any remaining multinary symbols;
determining a probability balance between 1 and 0 for each of a prior binary informational element and a current binary informational element;
if the probability balance of the prior binary informational element is similar to the probability balance of the current binary informational element
grouping any fractional symbols of the prior binary informational element with the current binary informational element, and
coding said grouped symbols using a variable length coding technique;
if the probability balance of the prior binary informational element is not similar to the probability balance of the current binary informational element
coding any fractional symbols of the prior binary informational element,
grouping symbols of the current binary informational group; and
coding said grouped symbols using a variable length coding technique.

2. The method of claim 1, wherein:
said step of determining a probability balance between 1 and 0 for each of a prior binary informational element and a current binary informational element includes estimates from the previously coded symbols.

3. The method of claim 1, wherein:
said step of determining a probability balance between 1 and 0 for each of a prior binary informational element and a current binary informational element includes computing by pre-scanning refinement coefficients to be coded.

4. The method of claim 1, wherein:
each of said steps of grouping any fractional symbols of the prior binary informational element and grouping symbols of the current binary informational group is unchanged throughout an enhancement layer.

5. The method of claim 1, wherein:
each of said steps of grouping any fractional symbols of the prior binary informational element and grouping symbols of the current binary informational group is configurable in a localized region.

6. The method of claim 1, wherein:
if the probability balance of the prior binary informational element is similar to but opposite the probability balance of the current binary informational element
bit-reversing symbols of the current binary informational group;
grouping any fractional symbols of the prior binary informational element with the bit reversed current binary informational element, and
coding said grouped symbols using a variable length coding technique.

* * * * *